(12) United States Patent
Kato et al.

(10) Patent No.: US 10,916,354 B2
(45) Date of Patent: Feb. 9, 2021

(54) SUNLIGHT SHIELDING MEMBER

(71) Applicant: Central Glass Company, Limited, Ube (JP)

(72) Inventors: Kazuhiro Kato, Matsusaka (JP); Yuki Horie, Matsusaka (JP)

(73) Assignee: Central Glass Company, Limited, Ube (JP)

( * ) Notice: Subject to any disclaimer, the term of this patent is extended or adjusted under 35 U.S.C. 154(b) by 76 days.

(21) Appl. No.: 16/315,332

(22) PCT Filed: Jul. 24, 2017

(86) PCT No.: PCT/JP2017/026666
§ 371 (c)(1),
(2) Date: Jan. 4, 2019

(87) PCT Pub. No.: WO2018/051638
PCT Pub. Date: Mar. 22, 2018

(65) Prior Publication Data
US 2019/0252086 A1   Aug. 15, 2019

(30) Foreign Application Priority Data
Sep. 15, 2016 (JP) .................... 2016-180585

(51) Int. Cl.
*G21F 1/12* (2006.01)
*B32B 9/00* (2006.01)
(Continued)

(52) U.S. Cl.
CPC ............. *G21F 1/125* (2013.01); *B32B 9/00* (2013.01); *B32B 15/00* (2013.01); *B32B 15/04* (2013.01);
(Continued)

(58) Field of Classification Search
CPC .......... B32B 15/00; B32B 15/04; B32B 9/00; B32B 2307/204; B32B 2307/412;
(Continued)

(56) References Cited

U.S. PATENT DOCUMENTS 6,104,530 A    8/2000 Okamura et al.
6,391,400 B1 * 5/2002 Russell .............. B32B 17/10
                                                    296/84.1
(Continued)

FOREIGN PATENT DOCUMENTS

CN         1635952 A      7/2005
JP       10-217380 A      8/1998
(Continued)

OTHER PUBLICATIONS

International Search Report (PCT/ISA/210) issued in PCT Application No. PCT/JP2017/026666 dated Oct. 24, 2017 with English translation (five pages).
(Continued)

*Primary Examiner* — Balram T Parbadia
(74) *Attorney, Agent, or Firm* — Crowell & Moring LLP

(57) ABSTRACT

The object of the invention is to obtain a solar radiation shielding member that has a good visible light transmittance and shows no redness when viewed from the front and when obliquely viewed, without impairing the solar radiation transmittance. A solar radiation shielding member, wherein a first dielectric film, a first metal film, a second dielectric film, a second metal film, a third dielectric film, a third metal film, and a fourth dielectric film are stacked on a transparent substrate; the first dielectric film comprises at least two dielectric layers containing a layer having a refractive index of 2.4 or greater, and the first dielectric film as a whole has a refractive index in a range of 1.8-2.0; the second dielectric film has an optical film thickness of 165-201 nm; the third
(Continued)

dielectric film has an optical film thickness of 147-182 nm; the fourth dielectric film has an optical film thickness of 75-120 nm; a geometric film thickness of the first metal film, the second metal film, and the third metal film is 30-40 nm in total; a geometric film thickness of the second metal film is in a range of 1.01-1.55 relative to a geometric film thickness of each of the first metal film and the third metal film.

7 Claims, 3 Drawing Sheets

(51) Int. Cl.
| | | |
|---|---|---|
| | *B32B 15/04* | (2006.01) |
| | *G02B 1/115* | (2015.01) |
| | *G02B 5/26* | (2006.01) |
| | *G02B 5/28* | (2006.01) |
| | *B32B 15/00* | (2006.01) |
| | *G02B 1/116* | (2015.01) |

(52) U.S. Cl.
CPC .............. *G02B 1/115* (2013.01); *G02B 1/116* (2013.01); *G02B 5/26* (2013.01); *G02B 5/28* (2013.01); *B32B 2307/204* (2013.01); *B32B 2307/412* (2013.01); *B32B 2307/418* (2013.01); *B32B 2551/00* (2013.01)

(58) Field of Classification Search
CPC .......... B32B 2307/418; B32B 2551/00; G02B 1/115; G02B 1/116; G02B 5/26; G02B 5/282; G21F 1/125; G21F 1/12
See application file for complete search history.

(56) References Cited

U.S. PATENT DOCUMENTS

| | | | | |
|---|---|---|---|---|
| 6,825,976 B2* | 11/2004 | Paul | ...................... | G02B 1/115 359/350 |
| 8,025,957 B2* | 9/2011 | Thiel | ................... | C03C 17/3681 428/216 |
| 8,557,391 B2* | 10/2013 | Frank | ................... | C03C 17/3626 428/434 |
| 2002/0136905 A1* | 9/2002 | Medwick | ............ | C03C 17/3639 428/432 |
| 2003/0049464 A1 | 3/2003 | Glenn et al. | | |
| 2003/0085649 A1 | 5/2003 | Wachi et al. | | |
| 2003/0180547 A1 | 9/2003 | Buhay et al. | | |
| 2006/0280951 A1 | 12/2006 | Fleury et al. | | |
| 2012/0177900 A1 | 7/2012 | Laurent et al. | | |

FOREIGN PATENT DOCUMENTS

| | | |
|---|---|---|
| JP | 2003-58064 A | 2/2003 |
| JP | 2003-133787 A | 5/2003 |
| JP | 2005-516818 A | 6/2005 |
| JP | 2007-505810 A | 3/2007 |
| JP | 2010-536707 A | 12/2010 |
| JP | 2013-502366 A | 1/2013 |
| JP | 2014-124815 A | 7/2014 |
| WO | WO 03/068500 A1 | 8/2003 |
| WO | WO 2009/029466 A1 | 3/2009 |
| WO | WO 2015/102923 A1 | 7/2015 |

OTHER PUBLICATIONS

Japanese-language Written Opinion (PCT/ISA/237) issued in PCT Application No. PCT/JP2017/026666 dated Oct. 24, 2017 (three pages).
Chinese-language Office Action issued in Chinese Application No. 201780056455.7 dated Aug. 31, 2020 (seven (7) pages).

* cited by examiner

SUNLIGHT SHIELDING MEMBER

TECHNICAL FIELD

The present invention relates to a multilayered body having a solar radiation shielding function and particularly to a solar radiation shielding member having three layers of Ag films.

BACKGROUND TECHNOLOGY

In windows provided at opening sections of buildings and vehicles, for the purpose of reducing the use of cooling and heating in the rooms, solar radiation shielding members capable of shielding solar radiation entering into the rooms are widely used. Solar radiation shielding members used for architectural windows are known as a low radiation glass in which a metal film is formed on the glass plate surface. Furthermore, as solar radiation shielding members used for vehicle windows, there are known a glass in which a metal film similar to the above is formed, etc.

As the above-mentioned solar radiation shielding members, a multilayered body in which Ag films and transparent dielectric films interposing the Ag film therebetween are stacked on a substrate is widely used. In particular, since a multilayered body using two layers of Ag films (for example, a multilayered body of the first transparent dielectric film, Ag film, the second transparent dielectric film, Ag film, and the third transparent dielectric film in this order on a glass plate) has a high solar radiation shielding function, various solar radiation shielding members have been examined.

The above-mentioned solar radiation shielding member has a tendency that the solar radiation shielding function improves with the increase of the total film thickness of Ag films. Up to now, it has been reasonable to make a multilayered body having two of the above-mentioned Ag films from a balance between the cost and the required capability. In recent years, however, there has been an increasing demand for further improving the solar radiation shielding function, and there has been a study on a multilayered body having three of the Ag films.

For example, Patent Publication 1 proposes a coating for controlling the amount of solar radiation transmission, with three layers of infrared reflecting metal films and three layers of anti-reflective films. In this publication, as the anti-reflective films, there are cited oxides of zinc, titanium, hafnium, zirconium, niobium, bismuth, indium, tin and mixtures of thereof, and, as the infrared reflecting metal films, there are cited gold, silver, aluminum, or mixtures or alloys thereof. It is disclosed that the obtained coating can have a visible light transmittance of 60% or higher, an external appearance with neutral color (a* and b* are ±|3| or less), a total solar energy reflectance over 300-2150 nm of 20-50%, and a sheet resistance of 1.5-3.5 Ω/□.

For example, Patent Publication 2 proposes a sunlight control coating that can be used for vehicle windows. In the sunlight control coating having three layers of Ag infrared reflecting metal films, the thickness is decreased in the order of the first infrared reflecting metal film, the second infrared reflecting metal film, and the third infrared reflecting metal film, from the glass plate side, thereby suppressing ultraviolet transmittance and/or infrared transmittance while securing a desired visible light transmittance. For example, Example 1 discloses, in a structure of a laminated glass using a highly transparent glass, a multilayered body achieving a visible light transmittance of 70% or higher, a total sunlight reflectance of about 30-50% and almost neutral colors of the transmitted light and the reflected light. Furthermore, Example 3 in which the thickness of the second infrared reflecting metal film was made to be thickest is capable of making the reflected light have a neutral color while the visible light transmittance is comparable to that of Example 1. In Patent Publication 2, the color tone of the transmitted light and/or reflected light was measured by changing the view angle and/or the light source, but the transmitted color tone when obliquely viewed has not been measured.

Similar to Patent Publication 2, for example, Patent Publication 3 discloses a multilayered body in which a metal functional layer on a glass plate side is thickest, and a metal functional layer of the top layer is thinnest. In examples of this publication, in a laminated glass structure using a soda-lime glass, there are disclosed multilayer glazing units that the visible light transmittance is about 73%, that the visible light reflectance is about 12%, and that redness of the color tones of the reflected lights at 0° and 60° is suppressed. Furthermore, it discloses that the visible light transmittance is lowered when the metal functional layer of the top layer is thickest and the metal functional layer on the glass plate side is thinnest and that the difference between the reflected lights at 0° and 60° increases. However, in Patent Publication 3, there is no actual measurement about solar radiation shielding function, and to what extent it is effective as a solar radiation shielding member is not clear.

PRIOR ART PUBLICATIONS

Patent Publications

Patent Publication 1: JP Patent Application Publication 2005-516818.

Patent Publication 2: JP Patent Application Publication 2010-536707.

Patent Publication 3: JP Patent Application Publication 2013-502366.

SUMMARY OF THE INVENTION

Task to be Solved by the Invention

As mentioned above, in recent years, for the purpose of using solar radiation shielding members that are high in solar radiation shielding function for architectural and vehicle windows, there has been a study on a metal film using three layers of Ag films. In the case of use for architectural windows, there is a high demand for a high solar radiation shielding function and a good daylighting property and for one having a visible light transmittance of 60-70% or more when produced as a multilayered glass or a laminated glass. Furthermore, in the case of use for vehicle windows, not to impair the driver's visibility, it is necessary that the visible light transmittance is 70% or higher when used as a windshield.

Furthermore, improving the solar radiation shielding function results in increasing the infrared reflectance. This affects the reflectance of around 700 nm that is a wavelength region corresponding to red color, and the transmitted color tone and/or the reflected color tone will have a reddish color. In particular, in the case of use as an architectural window, since a moderate external color tone is preferred, it is preferable to avoid having a reddish color in the transmitted color tone and/or reflected color tone. Furthermore, even in vehicular use, it is requested to have a good external appearance quality without having a reddish color when a person sees from the front or obliquely.

In general, a solar radiation shielding member using Ag films is improved in the solar radiation shielding function as the total thickness of the Ag films increases, but is lowered in the visible light transmittance to have a trade-off relationship. Therefore, it is difficult to achieve the improvement of the visible light transmittance and the improvement of the solar radiation shielding function at the same time.

Herein, the above-mentioned Patent Publication 2 discloses a good sunlight control coating that the solar radiation shielding function is high, that the visible light transmittance is about 71-72%, and that redness is not shown when viewed from the front, when made into a laminated glass. However, its redness when obliquely viewed has not sufficiently been examined. Furthermore, in this publication, a high transmission glass is used as a transparent substrate to increase the visible light transmittance. Thus, depending on the glass type used as the transparent substrate, it is expected to have a possibility that the required capabilities are not satisfied. Furthermore, Patent Publication 3 discloses a multilayered body that is high in visible light transmittance and shows no redness when obliquely viewed. However, as mentioned above, it has no disclosure about the solar radiation shielding function, and to what extent it is effective is not clear.

Therefore, it is an object of the present invention to obtain a novel solar radiation shielding member that has a good visible light transmittance and shows no redness when viewed from the front and when obliquely viewed, without impairing the solar radiation transmittance.

Means for Solving the Task

As a result of an eager study on the above task by the present inventors, we newly found that it is possible by making the thickness of the Ag film at the second layer in the middle thickest to improve the visible light transmittance without impairing the solar radiation shielding function. Furthermore, we found that it is possible to increase the visible light transmittance by making the thicknesses of the Ag films at the first layer and the third layer fall within a particular range relative to the thickness of the Ag film at the second layer, even if the total thickness of the Ag films is at the same level. Furthermore, we found that the transmitted light and/or the reflected light shows a reddish color when obliquely viewed, unless making the dielectric films at the second to fourth layers fall within a particular range. Furthermore, we found that the visible light transmittance is impaired due to the increase of the visible light reflectance, unless using at least two films including a high refractive index film as the films constituting the dielectric film at the first layer and making the refractive index of the first layer fall within a particular range.

That is, the present invention provides a solar radiation shielding member, wherein a first dielectric film, a first metal film, a second dielectric film, a second metal film, a third dielectric film, a third metal film, and a fourth dielectric film are stacked in this order on a transparent substrate, wherein the first dielectric film comprises at least two dielectric layers containing a layer having a refractive index of 2.4 or greater, and the first dielectric film as a whole has a refractive index in a range of 1.8-2.0, wherein the second dielectric film has an optical film thickness of 165-201 nm, wherein the third dielectric film has an optical film thickness of 147-182 nm, wherein the fourth dielectric film has an optical film thickness of 75-120 nm, wherein a geometric film thickness of the first metal film, the second metal film, and the third metal film is 30-40 nm in total, wherein a geometric film thickness of the second metal film is in a range of 1.01-1.55 relative to a geometric film thickness of each of the first metal film and the third metal film.

Advantageous Effect of the Invention

From the above, it becomes possible by the present invention to obtain a novel solar radiation shielding member that has a good visible light transmittance and shows no reddish color when viewed from the front and when obliquely viewed, without impairing the solar radiation transmittance.

MODE FOR IMPLEMENTING THE INVENTION

1: Explanation of Terms

Figure 1:
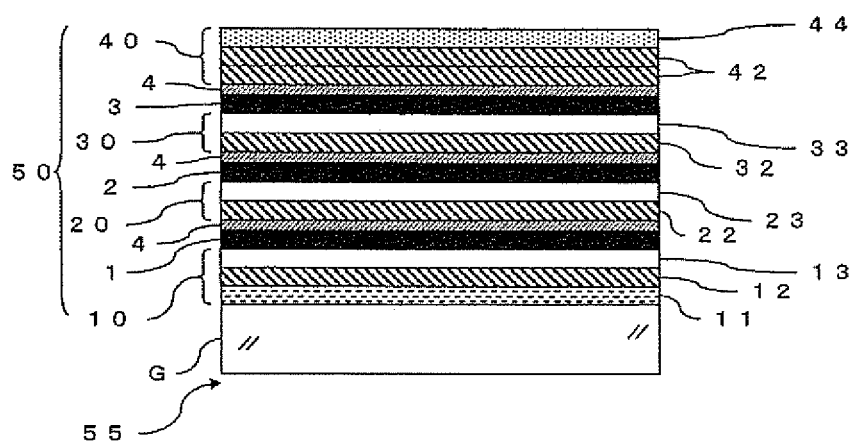
FIG. 1 is a schematic sectional view showing one exemplary mode of the present invention.

In the following, terms of the specification are explained.

Various Wavelengths Lights

"Visible light" in the specification refer to a light having a wavelength in a range of 380-780 nm. Furthermore, "solar radiation shielding" in the specification refers to suppressing transmission of energy of a light having a wavelength in a range of 300-2500 nm. Furthermore, in the specification, "solar shielding function" is evaluated by "solar radiation transmittance".

Transmittance, Reflectance & Color Tone

It is possible to measure the visible light transmittance, the visible light reflectance, the solar radiation transmittance, the solar radiation reflectance, the visible light transmitted color tone and reflected color tone by using an automatic recording spectrophotometer (U-4000 made by Hitachi, Ltd.), a spectrophotometer using an absolute reflection measurement unit with a manual stage (V-670 and ARSN-733 made by JASCO Corporation), a spectrophotometer (CM-2600d made by Konika Minolta, Inc.), etc. Furthermore, the reflectance and the reflected color tone are respectively calculated on the side of the transparent substrate with no multilayered film and on the film surface side with the multilayered film formed. Of the above, it is possible to calculate the visible light transmittance, the visible light reflectance, the solar radiation transmittance, and the solar radiation reflectance by a method conforming to JIS R3106 (1998) or a method based on that. Furthermore, regarding the transmitted color tone and the reflected color tone, it is possible to calculate a* of CIE L*a*b* color space by a method conforming to JIS Z8781-4 and a method based on that.

Refractive Index

"Refractive index" in the specification refers to the value at a wavelength of 550 nm. Furthermore, it is possible to calculate refractive index by an optical simulation (Reflectance-transmittance method) from the values obtained by measuring the obtained visible light transmittance and visible light reflectance (film surface) by an automatic recording spectrophotometer (U-4000 made by Hitachi, Ltd.) after preparing a single layer in a condition similar to that of the solar radiation shielding member.

Geometric Film Thickness

Geometric film thickness has the same meaning as the film thickness generally used and simply indicates the thickness of a film or layer. As to the geometric thickness, it is possible to calculate the thickness of the target layer or film by using a film formation rate when preparing the target single layer, after determining the film formation rate from the product of the thickness of the single layer prepared under the same film formation condition as that of the solar radiation shielding member and the conveyance speed of the substrate.

Optical Film Thickness

Optical film thickness refers to the value representing the product of the geometric film thickness and the refractive index. It can be calculated from the product of the refractive index at a wavelength of 550 nm and the film thickness of a single layer prepared under the same film formation condition as that of the solar radiation shielding member.

Multilayered Film

"Multilayered film" in the specification refers to the entirety of the films on the transparent substrate. "Film" refers to one obtained by stacking at least one layer, and "layer" is the minimum unit divided by boundaries. The layer may be composed of one component or a plurality of components. Furthermore, distribution of the component in the layer may be uniform or nonuniform. Furthermore, "over" of "over the transparent substrate", etc. means that it may be in contact with the transparent substrate or that any other film(s) or layer(s) may be interposed therebetween. Furthermore, in the solar radiation shielding member, for example, shown in FIG. 1, the side of glass plate G may be designated by "lower", and the side of protective layer 44 may be designated by "upper". The layer at the top like protective layer 44 in FIG. 1 may be described as "top layer".

2: Solar Radiation Shielding Member

The present invention provides a solar radiation shielding member, wherein a first dielectric film, a first metal film, a second dielectric film, a second metal film, a third dielectric film, a third metal film, and a fourth dielectric film are stacked in this order on a transparent substrate, wherein the first dielectric film comprises at least two dielectric layers containing a layer having a refractive index of 2.4 or greater, and the first dielectric film as a whole has a refractive index in a range of 1.8-2.0, wherein the second dielectric film has an optical film thickness of 165-201 nm, wherein the third dielectric film has an optical film thickness of 147-182 nm, wherein the fourth dielectric film has an optical film thickness of 75-120 nm, wherein a geometric film thickness of the first metal film, the second metal film, and the third metal film is 30-40 nm in total, wherein a geometric film thickness of the second metal film is in a range of 1.01-1.55 relative to a geometric film thickness of each of the first metal film and the third metal film.

In the following, a solar radiation shielding member of the present invention is explained with reference to FIG. 1. The present invention is not limited to FIG. 1.

Solar Radiation Shielding Member 55

The solar radiation shielding member 55 refers to a multilayered film 50 of from the above first dielectric film 10 to fourth dielectric film 40, and a transparent substrate having the multilayered film 50 formed thereon. In the present invention, when the transparent substrate has a thickness of 2 mm, it is possible to make the solar radiation shielding member 55 have a visible light transmittance of 74% or higher, a solar radiation transmittance of 38% or lower, and a* of less than +3 in the transmitted color tone, the substrate surface reflected color tone and the film surface reflected color tone either when viewed from the front or when obliquely viewed.

Furthermore, it is possible to make the solar radiation shielding member 55 have visible light reflectances of 12% or less on the substrate surface and on the film surface. By lowering the visible light reflectance, it is possible to suppress glare. Therefore, it is preferable.

Transparent Substrate

The transparent substrate is a platy substrate for forming thereon a multilayered film 50. In the specification, the transparent substrate may be formed into a substrate having a visible light transmittance of 80% or higher at a thickness of 2 mm. Although glass plate G is used as the transparent substrate in FIG. 1, it is not limited to this. It is optional to use a transparent resin plate, etc.

In the case of using glass plate G as the transparent substrate, glass plate G is not particularly limited. It is possible to use, for example, soda-lime glass that is generally used, non-alkali glass, high transmission glass, air-quench tempered glass, chemically strengthened glass, borosilicate glass, low-expansion glass, zero-expansion glass, low-expansion crystallized glass, zero-expansion crystallized glass, etc. Furthermore, in the case of using a transparent resin plate, it is possible to cite, for example, polyethylene terephthalate resin, polyethylene naphthalate resin, polyether sulfone resin, polycarbonate resin, polyvinylchloride resin, etc.

Metal Films

The metal films are designated as the first metal film 1, the second metal film 2 and the third metal film 3 in this order from the side of the transparent substrate. Firstly, in the present invention, the total value of the thicknesses of the metal films is adjusted to 30-40 nm, thereby achieving a good solar transmittance. If the total value of the thicknesses exceeds 40 nm, the solar radiation transmittance becomes good, but the visible light transmittance is lowered, and the reflected color tone tends to have redness when obliquely viewed. Furthermore, if it is less than 30 nm, the solar radiation shielding function tends to become insufficient.

Furthermore, in the present invention, the second metal film 2 is made thickest, and its thickness ratio to another metal film is made to fall within a range of 1.01 to 1.55, thereby improving the visible light transmittance without impairing the solar transmittance. If it is less than 1.01 and exceeds 1.55, the visible light transmittance may become insufficient.

As the metal film, it is preferable to use a metal film containing 90-100% of Ag. Furthermore, since Ag film tends to deteriorate by heat, oxygen, etc., it is optional to contain Pd, Au, Pt, Ti, Al, Cu, Cr, Mo, Nb, Bi, Ni, etc. in the film for the purpose of improving heat resistance and/or chemical durability.

It is preferable that the first metal film 1, the second metal film 2 and the third metal film 3 are respectively formed on the tops of the first dielectric film 10, the second dielectric film 20 and the third dielectric film 30. In preferable structures of the after-mentioned dielectric films 10, 20 and 30, they have seed layers 13, 23, 33 as their top layers. Therefore, the formation of Ag-containing metal films on the tops of the seed layers 13, 23, 33 makes it possible to improve crystallinity of the Ag films and increase the solar radiation shielding function.

Blocker Film 4

It is preferable to form a blocker film 4 on the top of each metal film. When forming each dielectric film on the metal film, the metal film may be deteriorated by oxygen, etc. if each dielectric film 20, 30, 40 is formed on the top of the metal film in exposed condition. Therefore, the blocker film 4 is provided for the purpose of protecting this metal film. As the blocker film 4, Zn, Sn, Ti, Al, NiCr, Cr, Zn alloy, Sn alloy, etc. is preferable. As the blocker film 4, it is preferable to use one that becomes transparent rapidly by oxidation or nitriding at last, because the visible light transmittance is not unnecessarily impaired. The film thickness is not particularly limited, but normally it suffices to have about 1-5 nm in geometric film thickness. Furthermore, it is preferable to make the thickness as thin as possible in order not to impair the visible light transmittance. Furthermore, it is optional to interpose another film between the blocker film 4 and the dielectric film thereon, but it is preferable to respectively provide the second dielectric film 20, the third dielectric film 30 and the fourth dielectric film 40 on the tops of respective blockers 4.

First Dielectric Film 10

The first dielectric film 10 is a dielectric film provided on the transparent substrate. It comprises at least two dielectric layers containing a layer having a refractive index of 2.4 or higher. It is a film such that the first dielectric film as a whole has a refractive index in a range of 1.8-2.0. If not containing a layer having a refractive index of 2.4 or higher, or if refractive index of the film as a whole is not in a range of 1.8-2.0, the visible light transmittance may become insufficient. Furthermore, it is preferable that the first dielectric film 10 is provided on the top of the transparent substrate.

To obtain the above-mentioned first dielectric film, it is preferable to adjust its optical film thickness to 105-140 nm. If the film thickness is out of this range, the refractive index as a whole may not fall within a range of 1.8-2.0. Furthermore, it is preferable to have an anti-reflective layer 12 made of a Ti-containing oxide and to make the anti-reflective layer 12 have an optical thickness of 5-70 nm. Furthermore, it is preferable that the first dielectric layer 10 has a passivation layer 11 made of a Si-containing oxide, the Ti-containing anti-reflective layer 12, and a seed layer 13 made of a Zn-containing oxide in this order from the top of the transparent substrate.

For the passivation layer 11, it is preferable to use a dielectric of a Si-containing oxide as mentioned above. For example, in the case of using a glass plate G as the transparent substrate, if the glass plate G is placed in a heated environment, there is a possibility that an alkali component(s), etc. diffuses from the glass plate G into the metal film. Thus, the passivation layer 11 is provided over the transparent substrate, preferably on the top of the transparent substrate. With this, it becomes possible to suppress deterioration of the metal film. Furthermore, as a dielectric of the Si-containing oxide, it is possible to use, for example, $SiO_2$.

As the passivation layer 11, it is possible to use a Si-containing dielectric. This dielectric may be an alloy containing 0.1-30 wt % of Al, Zr, Ti, etc. relative to the dielectric of the passivation layer 11 as a whole. As this dielectric, for example, an oxide, nitride or oxynitride of Si or the above Si alloy can be cited. In particular, a Si and Al alloy oxide is preferable, since it is capable of suppressing electric discharge when forming into a film and has a compact structure and therefore is superior in barrier property as the passivation layer. In the case of using a Si and Al alloy oxide, its optical film thickness is preferably 10-110 nm, in order to make refractive index of the first dielectric film fall within a range of 1.8-2.0.

As mentioned above, as the anti-reflective layer 12, it is preferable to use a Ti-containing dielectric, more preferably a Ti-containing oxide. Furthermore, Ti-containing oxide tends to have a refractive index of 2.4 or higher, has a low price, is superior in mechanical strength, also has an ultraviolet shielding function, hardly reacts with various gases and water and therefore hardly deteriorate. Therefore, it is preferable to use the anti-reflective layer 12 as a first dielectric film's layer having a refractive index of 2.4 or higher. By providing the above-mentioned anti-reflective layer 12, it becomes possible to lower the visible light reflectance. Furthermore, in order to make refractive index of the first dielectric film 10 as a whole fall within a range of 1.8-2.0, it is optional to adjust the lower limit of the optical film thickness of the anti-reflective layer 12 to more preferably 14 nm or greater. Furthermore, besides Ti oxide, as long as it is possible to adjust the refractive index to 2.4 or greater, it is optional to use Nb oxide, Zr oxide, Ta oxide, mixed oxides thereof, etc.

As the Ti-containing oxide, it is possible to cite, for example, $TiO_2$ and a Ti alloy oxide containing 0.1-30 wt % of Si, Al, Zn, In, Sn, Nb, Zr or Ta relative to Ti. It is possible to cite $Nb_2O_5$ as the Nb oxide, $ZrO_2$ as the Zr oxide, and $Ta_2O_5$ as the Ta oxide.

As the seed layer 13, it is preferable to use a dielectric made of a Zn-containing oxide as mentioned above. When using a Ag film as the metal film, the seed layer 13 accelerates the Ag crystal growth when forming the Ag film. By the Ag crystal growth, it becomes possible to further improve various optical characteristics.

As the seed layer 13, it is possible to use a Zn-containing dielectric. This dielectric may be an alloy containing 1-45 wt % of Al, Ga, Sn, etc. relative to the dielectric as a whole. As this dielectric, it is possible to cite, for example, an oxide of Zn or of the above Zn alloy. In particular, Zn oxide such as ZnO is preferable. Furthermore, it is preferable to make the seed layer 13 have an optical film thickness of 5-20 nm. If it is less than 5 nm, the effect of accelerating the Ag crystal growth tends to become insufficient. If it exceeds 20 nm, crystal grain boundaries may exist in the seed layer 13. With this, various gases and/or water may penetrate from the crystal grain boundaries to deteriorate the metal film.

It is preferable that the first dielectric film 1 has the passivation layer 11 made of a Si-containing oxide, the anti-reflective layer 12 made of the above Ti-containing oxide, and the seed layer 13 made of a Zn-containing oxide. As mentioned above, provision of the passivation layer 11 on the side of the transparent substrate makes it possible to prevent various gases and/or water, which deteriorates the metal layer, from penetrating from the substrate side. Furthermore, provision of the seed layer 13 makes it possible to accelerate the crystal growth of the first metal layer 1. Furthermore, provision of the anti-reflective layer 12 between the passivation layer 11 and the seed layer 13 makes refractive index of the first dielectric film 1 as a whole fall within a desired range. This makes it possible to obtain the target optical characteristics.

Second Dielectric Film 20 & Third Dielectric Film 30

The second dielectric film 20 is a dielectric film having an optical film thickness within a range of 165-201 nm. It has influences mainly on the visible light's transmittance, reflectance, transmitted color tone and reflected color tone. In particular, in the case of the solar radiation shielding member 55 of the present invention, if it is less than 165 nm, the visible light transmittance increases, but the reflected color tone particularly when viewed from the front turns to have a reddish color. Furthermore, if it exceeds 201 nm, the visible light reflectance increases. As a result, this may lower transmittance.

The third dielectric film 30 is a dielectric film having an optical film thickness within a range of 147-182 nm. Similar to the second dielectric film 20, it has influences mainly on the visible light's transmittance, reflectance, transmitted color tone and reflected color tone. In particular, in the case of the solar radiation shielding member 55 of the present invention, if it is less than 147 nm, the visible light reflectance increases. Therefore, the visible light transmittance tends to lower. If it exceeds 182 nm, the visible light transmittance increases, and the reflected color tone has a reddish color when viewed from the front and when obliquely viewed.

The second dielectric film 20 and the third dielectric film 30 are not particularly limited, and it suffices to use therein a dielectric having a refractive index that is different from that of each metal film. For example, it is possible to use a dielectric having a refractive index of around 2.0, such as ZnO, ZnAlO, ZnSnO, ZnGaO, $In_2O_3$, InSnO, InZnO, $Si_3N_4$, and SiAlN. As to the above-mentioned alloy oxides and alloy nitrides, those having component ratios different from the description are also included therein. For example, ZnSnO is not necessarily limited to Zn:Sn:O=1:1:1. Of the above-mentioned dielectrics, ZnSnO, which is a dielectric made of a Zn and Sn containing oxide, is known to have a compact film structure and is superior in barrier property against gases and/or water that deteriorates the metal film. Therefore, it can preferably be used.

Furthermore, similar to the first dielectric film 10, it is preferable that the second dielectric film 20 and the third dielectric film 30 have seed layers 23, 33. In the case of having the seed layers 23, 33, it is preferable that the above-mentioned dielectric films 20, 30 are defined as anti-reflective layers 22, 32 for convenience, that the seed layers 23, 33 are provided on the anti-reflective layers 22, 32, and that a second metal film 2 and a third metal film 3 are respectively provided on the tops of the seed layers 23, 33. For the seed layers 23, 33, it suffices to use a material similar to that of the above-mentioned seed layer 13 of the first dielectric layer 10.

Fourth Dielectric Film 40

The fourth dielectric film 40 is a dielectric film having an optical film thickness within a range of 75-120 nm. It has influences mainly on the transmitted color tone and the reflected color tone. In particular, in the case of the solar radiation shielding member 55 of the present invention, if it is less than 75 nm, the reflected color tone turns to have a reddish color. If it exceeds 120 nm, the visible light transmittance is considered to lower.

The fourth dielectric film 40 is not particularly limited. Similar to the second dielectric film 20, etc., it suffices to use a dielectric having a refractive index that is different from that of each metal film. Furthermore, similar to the second dielectric film 20 and the third dielectric film 30, it is preferable to use a dielectric made of a Zn and Sn containing oxide.

Furthermore, the fourth dielectric film 40 is a film containing the top layer of the solar radiation shielding member 55 of the present invention, and it is preferable to have a protective layer 44 as the top layer. The protective layer 44 is a layer that prevents the metal films in the inside from deteriorating by blocking oxygen etc. from the surface of the multilayered film 50. For example, it is possible to use a dielectric such as $SiO_2$, SiAlO, etc.

Furthermore, it is preferable that the fourth dielectric film 40 has a a layer made of a Ti-containing dielectric and that the fourth dielectric film as a whole has an average refractive index of 1.85-2.05. The layer made of a Ti-containing dielectric is preferable, since it is capable of improving mechanical durability of the multilayered film 50 and increasing the visible light transmittance by the anti-reflective effect. More preferably, it is optional to use $TiO_2$. On the other hand, a layer made of a Ti-containing dielectric tends to have a refractive index of 2.4 or higher. If the refractive index is too high, the transmitted color tone and/or the reflected color tone turns to a reddish color. Therefore, it is preferable to use the above-mentioned protective layer 44 or another dielectric layer(s) too such that the average refractive index of the fourth dielectric film 40 as a whole falls within a range of 1.85-2.05.

Furthermore, in FIG. 1, the dielectric layer is described to have anti-reflective layer 42, anti-reflective layer 42 and protective layer 44 from the bottom. When the anti-reflective layer 42 is divided into two in the film thickness direction to have a two-layer structure as shown in FIG. 1, cracks generated in the layer are considered to hardly extend. With this, mechanical strength improvement and chemical durability improvement can be expected. Therefore, it is preferable.

3: Method for Producing Solar Radiation Shielding Member

It is possible to form the multilayered film 50 of the solar radiation shielding member 55 of the present invention by sputtering method, electron-beam evaporation method, ion plating method, etc. Sputtering method is suitable in terms of being easy to secure productivity and uniformity. In the following, a formation method using sputtering method is described. The present invention is not limited to the following production method.

The formation of the multilayered film 50 by sputtering method is conducted while conveying the transparent substrate in an apparatus in which sputtering targets to become materials of respective layers have been installed. In the apparatus, a vacuum chamber to conduct the layer formation is installed. Sputtering is conducted by introducing, in a condition in which the target is installed in the vacuum chamber, an atmospheric gas used when conducting sputtering, and then applying a negative electric potential to the target to generate plasma in the apparatus.

The method for obtaining a desired film thickness is not particularly limited, since it is different depending on the type of the sputtering apparatus. There are widely used a method for obtaining a desired film thickness by changing the layer formation rate by adjusting the electric power applied to the target and/or the introduced gas condition, and a method for obtaining a desired film thickness by adjusting the substrate conveyance speed.

In the case of forming the dielectric films 10, 20, 30, 40, the target to be used may be either a ceramic target or a metal target. In either of them, the gas condition of the atmospheric gas to be used is not particularly limited. It suffices to suitably select the gas type and the mixing ratio in accordance with the target layer, for example, from Ar gas, $O_2$ gas, $N_2$ gas, etc. Furthermore, the gas to be introduced into the vacuum chamber may contain an arbitrary third component other than Ar gas, $O_2$ gas and $N_2$ gas.

Furthermore, when forming the second dielectric film 20, the third dielectric film 30, and the fourth dielectric film 40, it is preferable to conduct the film formation in an atmosphere of a reactive gas such as $O_2$ gas, $N_2$ gas or $CO_2$ gas such that each blocker film 4 directly under each dielectric film can be made transparent by oxidation, nitriding or oxynitriding.

In the case of forming the metal films 1, 2, 3, Ag target or Ag alloy target is used as the target to be used. As an atmospheric gas to be introduced at this time, it is preferable to use Ar gas, but it is optional to mix another gas as long as it does not impair optical characteristics of Ag.

In the case of forming the blocker film 4, it suffices to suitably select the target to be used, and it suffices to use an inert gas such as Ar as the atmospheric gas to be introduced. Furthermore, at this time, the blocker film 4 is made to have a film thickness such that its conventional oxidation or nitriding is possible in the subsequent step.

As the plasma generation source, it is possible to use any of a direct-current power source, an alternating-current power source, a power source in which alternating current and direct current are superimposed, etc. In case that abnormal discharge tends to occur when forming dielectric films, it is preferable to use a power source with the pulse application to a direct-current power source or an alternate-current power source.

4: Exemplary Mode

In the solar radiation shielding member 55 of the present invention, it is preferable to use a glass plate G as the transparent substrate and make a laminated glass in combination with another glass plate. In particular, since it is possible to adjust the visible light transmittance to 74% or higher, visibility is considered not to be greatly impaired, even in the case of making into a laminated glass. Furthermore, it is useful as an architectural window member by using it as a single plate or by incorporating it into a double glazing.

In the following, there is described a preferable exemplary mode of the solar radiation shielding member 55 which is capable of making the solar radiation shielding member 55 have a visible light transmittance of 74% or higher, a solar radiation transmittance of 38% or lower, and a* of less than +3 in the transmitted color tone, the substrate surface reflected color tone, and the film surface reflected color tone either when viewed from the front or when obliquely viewed, when the transparent substrate has a thickness of 2 mm.

Exemplary Mode 1

The structure of Exemplary Mode 1 is described in the following. Furthermore, the film thickness of each layer of the multilayered film 50 is described in Table 1. The number in Table 1 corresponds to the sign of FIG. 1. As the film thickness of the dielectric film, optical film thickness (nm) is described. As the film thicknesses of the metal film and the blocker film, geometric film thickness (nm) is described.

As mentioned above, the alloy oxide such as ZnSnO, ZnAlO, etc. is not necessarily limited to Zn:Sn:O=1:1:1. In case that the film thickness is 0, it means no formation of the corresponding layer. Furthermore, SiAlO layer means a layer containing 10 wt % of Al relative to Si, ZnAlO layer means a layer containing 2 wt % of Al relative to Zn, and ZnSnO layer means a layer containing 50 wt % of Sn relative to Zn. Ti film 4 of the blocker film 4 is described as a layer when the blocker film 4 has been formed, and it is oxidized by forming the dielectric film on the blocker film 4.

Soda-lime glass plate G (thickness: 2 mm)/SiAlO layer 11/$TiO_2$ layer 12/ZnAlO layer 13/Ag film 1/Ti film 4/ZnSnO layer 22/ZnAlO layer 23/Ag film 2/Ti film 4/ZnSnO layer 32/ZnAlO layer 33/Ag film 3/Ti film 4/ZnSnO layer 42/$TiO_2$ layer 42/SiAlO layer 44.

TABLE 1

|  | (11) | (12) | (13) | (1) | (4) | (22) | (23) | (2) | (4) | (32) | (33) | (3) | (4) | (42) | (42) | (44) |
|---|---|---|---|---|---|---|---|---|---|---|---|---|---|---|---|---|
| Ex. 1 | 45.5 | 44.4 | 19.9 | 11.5 | 0.2 | 0 | 187.4 | 12.5 | 0.2 | 0 | 169.5 | 10.5 | 0.2 | 81.9 | 4.9 | 22.8 |
| Ex. 2 | 45.5 | 49.3 | 19.9 | 11.5 | 0.2 | 163.8 | 19.9 | 12.5 | 0.2 | 145.4 | 19.9 | 10.5 | 0.2 | 79.9 | 4.9 | 19.7 |
| Ex. 3 | 45.5 | 51.7 | 19.9 | 11.5 | 0.2 | 172.0 | 19.9 | 12.5 | 0.2 | 149.5 | 19.9 | 10.5 | 0.2 | 79.9 | 4.9 | 19.7 |
| Ex. 4 | 37.9 | 49.3 | 19.9 | 11.5 | 0.2 | 163.8 | 19.9 | 12.5 | 0.2 | 145.4 | 19.9 | 10.5 | 0.2 | 79.9 | 9.9 | 19.7 |
| Ex. 5 | 53.1 | 49.3 | 19.9 | 11.5 | 0.2 | 163.8 | 19.9 | 12.5 | 0.2 | 145.4 | 19.9 | 10.5 | 0.2 | 79.9 | 4.9 | 19.7 |
| Ex. 6 | 45.5 | 49.3 | 19.9 | 11.5 | 0.2 | 163.8 | 19.9 | 12.5 | 0.2 | 145.4 | 19.9 | 10.5 | 0.2 | 49.1 | 19.7 | 19.7 |
| Ex. 7 | 45.5 | 49.3 | 19.9 | 11.5 | 0.2 | 163.8 | 19.9 | 14.0 | 0.2 | 145.4 | 19.9 | 10.5 | 0.2 | 79.9 | 4.9 | 19.7 |
| Ex. 8 | 45.5 | 49.3 | 19.9 | 11.5 | 0.2 | 163.8 | 19.9 | 15.0 | 0.2 | 145.4 | 19.9 | 10.5 | 0.2 | 79.9 | 4.9 | 19.7 |
| Ex. 9 | 45.5 | 49.3 | 19.9 | 11.5 | 0.2 | 163.8 | 19.9 | 12.0 | 0.2 | 145.4 | 19.9 | 10.5 | 0.2 | 79.9 | 4.9 | 19.7 |
| Ex. 10 | 45.5 | 12.3 | 57.8 | 11.5 | 0.2 | 163.8 | 19.9 | 12.5 | 0.2 | 145.4 | 19.9 | 10.5 | 0.2 | 79.9 | 4.9 | 19.7 |

Furthermore, the average refractive index of each of the first dielectric film 10 and the fourth dielectric film 40 as a whole, the total film thickness of the metal films 1, 2, 3, the ratio of the second metal film to the first metal film, and the ratio of the second metal film to the third metal film of the above Examples 1-10 are shown in the following Table 2. Refractive index of $TiO_2$ layer is 2.46, refractive index of ZnSnO layer is 2.05, refractive index of ZnAlO layer is 1.99, and refractive index of SiAlO layer is 1.52.

TABLE 2

| | Metal film | | | 1st dielectric film | 2nd Dielectric film |
|---|---|---|---|---|---|
| | (1) + (2) + (3) | (2)/(1) | (2)/(3) | Av. refractive index | Av. refractive index |
| Ex. 1 | 34.5 | 1.09 | 1.19 | 1.89 | 1.92 |
| Ex. 2 | 34.5 | 1.09 | 1.19 | 1.91 | 1.94 |
| Ex. 3 | 34.5 | 1.09 | 1.19 | 1.92 | 1.94 |
| Ex. 4 | 34.5 | 1.09 | 1.19 | 1.95 | 1.95 |
| Ex. 5 | 34.5 | 1.09 | 1.19 | 1.88 | 1.94 |
| Ex. 6 | 34.5 | 1.09 | 1.19 | 1.91 | 1.97 |
| Ex. 7 | 36.0 | 1.22 | 1.33 | 1.91 | 1.94 |
| Ex. 8 | 37.0 | 1.30 | 1.43 | 1.91 | 1.94 |

TABLE 2-continued

| | Metal film | | | 1st dielectric film | 2nd Dielectric film |
|---|---|---|---|---|---|
| | (1) + (2) + (3) | (2)/(1) | (2)/(3) | Av. refractive index | Av. refractive index |
| Ex. 9 | 34.0 | 1.04 | 1.14 | 1.91 | 1.94 |
| Ex. 10 | 34.5 | 1.09 | 1.19 | 1.81 | 1.94 |

As to Example 1 to Example 10 of Exemplary Mode 1, respective optical characteristics are described in the following Table 3. In Table 3, "film surface" refers to reflection on the side of the multilayered film 50, and "substrate surface" refers to reflection on the side of glass plate G. Furthermore, "10 degrees" and "60 degrees" refer to the transmitted color tone and the reflected color tone in directions inclined by 10 degrees and 60 degrees when a line perpendicular to the surface is defined as having 0 degrees.

TABLE 3

| | Visible light transmittance (%) | Visible light reflectance (%) | | Solar radiation transmittance (%) | Solar radiation reflectance (%) | | Transmitted color tone a* | | Film surface reflected color tone a* | | Substrate surface reflected color tone a* | |
|---|---|---|---|---|---|---|---|---|---|---|---|---|
| | | Film surface | Substrate surface | | Film surface | Substrate surface | 10 deg. | 60 deg. | 10 deg. | 60 deg. | 10 deg. | 60 deg. |
| Ex. 1 | 77.5 | 8.1 | 10.3 | 34.3 | 45.6 | 43.4 | -2.9 | -5.3 | -8.3 | -2.5 | -7.0 | -0.3 |
| Ex. 2 | 78.2 | 7.8 | 9.6 | 35.1 | 45.4 | 43.0 | -1.1 | -4.1 | -14.4 | -3.3 | -13.3 | -1.7 |
| Ex. 3 | 77.6 | 8.9 | 10.9 | 35.6 | 44.8 | 42.3 | -2.0 | -4.5 | -8.6 | -1.4 | -7.2 | -0.9 |
| Ex. 4 | 77.0 | 9.1 | 10.8 | 34.6 | 45.7 | 43.2 | -0.9 | -3.9 | -13.7 | -4.2 | -13.0 | -3.3 |
| Ex. 5 | 78.3 | 7.8 | 9.6 | 35.2 | 45.4 | 43.4 | -1.1 | -4.1 | -14.4 | -3.4 | -13.4 | -1.7 |
| Ex. 6 | 79.3 | 6.6 | 8.3 | 35.6 | 45.7 | 42.4 | -1.5 | -4.4 | -13.6 | -2.2 | -13.0 | 0.2 |
| Ex. 7 | 76.7 | 8.9 | 10.5 | 33.1 | 47.7 | 45.0 | -2.2 | -5.3 | -9.6 | -1.8 | -10.0 | 0.5 |
| Ex. 8 | 75.2 | 10.2 | 11.6 | 31.7 | 49.2 | 46.4 | -3.1 | -6.3 | -6.3 | -0.3 | -7.5 | 2.3 |
| Ex. 9 | 78.6 | 7.6 | 9.5 | 35.8 | 44.6 | 42.3 | -0.8 | -3.8 | -15.8 | -3.6 | -14.1 | -2.2 |
| Ex. 10 | 75.5 | 10.1 | 12.6 | 34.0 | 46.2 | 44.3 | 0.7 | -4.6 | -21.1 | -1.7 | -19.2 | -0.5 |

As above, Exemplary Mode 1 is capable of making the solar radiation shielding member 55 have a visible light transmittance of 74% or higher, a solar radiation transmittance of 38% or lower, and a* of less than +3 in the transmitted color tone, the substrate surface reflected color tone, and the film surface reflected color tone either when viewed from the front or when obliquely viewed, when the transparent substrate has a thickness of 2 mm.

Comparative Mode 1

Comparative Example 1 to Comparative Example 9 prepared by using the same layers as those of the above-mentioned Exemplary Mode 1, but changing the film thicknesses are described in Table 4. Furthermore, similar to the above Table 2, the average refractive index of each of the first dielectric film 10 and the fourth dielectric film 40 as a whole, the total film thickness of the metal films 1, 2, 3, the ratio of the second metal film to the first metal film, and the ratio of the second metal film to the third metal film of the above Examples 1-10 are shown in Table 5. Furthermore, respective optical characteristics of Table 4 are described in Table 6.

TABLE 4

| | (11) | (12) | (13) | (1) | (4) | (22) | (23) | (2) | (4) | (32) | (33) | (3) | (4) | (42) | (42) | (44) |
|---|---|---|---|---|---|---|---|---|---|---|---|---|---|---|---|---|
| Com. Ex. 1 | 45.5 | 49.3 | 19.9 | 11.5 | 0.2 | 163.8 | 19.9 | 12.5 | 0.2 | 145.4 | 19.9 | 10.5 | 0.2 | 14.3 | 37.0 | 19.7 |
| Com. Ex. 2 | 45.5 | 49.3 | 19.9 | 11.5 | 0.2 | 163.8 | 19.9 | 12.5 | 0.2 | 124.9 | 19.9 | 10.5 | 0.2 | 79.9 | 4.9 | 19.7 |
| Com. Ex. 3 | 45.5 | 49.3 | 19.9 | 11.5 | 0.2 | 163.8 | 19.9 | 12.5 | 0.2 | 165.9 | 19.9 | 10.5 | 0.2 | 79.9 | 4.9 | 19.7 |

TABLE 4-continued

|  | (11) | (12) | (13) | (1) | (4) | (22) | (23) | (2) | (4) | (32) | (33) | (3) | (4) | (42) | (42) | (44) |
|---|---|---|---|---|---|---|---|---|---|---|---|---|---|---|---|---|
| Com. Ex. 4 | 45.5 | 49.3 | 19.9 | 11.5 | 0.2 | 143.3 | 19.9 | 12.5 | 0.2 | 145.4 | 19.9 | 10.5 | 0.2 | 79.9 | 4.9 | 19.7 |
| Com. Ex. 5 | 45.5 | 49.3 | 19.9 | 11.5 | 0.2 | 184.3 | 19.9 | 12.5 | 0.2 | 145.4 | 19.9 | 10.5 | 0.2 | 79.9 | 4.9 | 19.7 |
| Com. Ex. 6 | 45.5 | 49.3 | 19.9 | 11.5 | 0.2 | 184.3 | 19.9 | 12.5 | 0.2 | 131.7 | 19.9 | 10.5 | 0.2 | 79.9 | 4.9 | 19.7 |
| Com. Ex. 7 | 45.5 | 49.3 | 19.9 | 11.5 | 0.2 | 194.5 | 19.9 | 12.5 | 0.2 | 121.5 | 19.9 | 10.5 | 0.2 | 79.9 | 4.9 | 19.7 |
| Com. Ex. 8 | 45.5 | 49.3 | 19.9 | 11.5 | 0.2 | 204.8 | 19.9 | 12.5 | 0.2 | 111.3 | 19.9 | 10.5 | 0.2 | 79.9 | 4.9 | 19.7 |
| Com. Ex. 9 | 45.5 | 49.3 | 19.9 | 11.5 | 0.2 | 215.0 | 19.9 | 12.5 | 0.2 | 101.0 | 19.9 | 10.5 | 0.2 | 79.9 | 4.9 | 19.7 |

TABLE 5

|  | Metal film | | | $1^{st}$ dielectric film | $2^{nd}$ Dielectric film |
|---|---|---|---|---|---|
|  | (1) + (2) + (3) | (2)/ (1) | (2)/ (3) | Av. refractive index | Av. refractive index |
| Com. Ex. 1 | 34.5 | 1.09 | 1.19 | 1.91 | 2.03 |
| Com. Ex. 2 | 34.5 | 1.09 | 1.19 | 1.91 | 1.94 |
| Com. Ex. 3 | 34.5 | 1.09 | 1.19 | 1.91 | 1.94 |
| Com. Ex. 4 | 34.5 | 1.09 | 1.19 | 1.91 | 1.94 |
| Com. Ex. 5 | 34.5 | 1.09 | 1.19 | 1.91 | 1.94 |
| Com. Ex. 6 | 34.5 | 1.09 | 1.19 | 1.76 | 1.94 |
| Com. Ex. 7 | 34.5 | 1.09 | 1.19 | 1.91 | 1.94 |
| Com. Ex. 8 | 34.5 | 1.09 | 1.19 | 1.91 | 1.94 |
| Com. Ex. 9 | 34.5 | 1.09 | 1.19 | 1.91 | 1.94 | as to the dielectric film, optical film thickness (nm) is described. As to the metal film and the blocker film, geometric film thickness (nm) is described. SiAlO layer means a layer containing 10 wt % of Al relative to Si, ZnAlO layer means a layer containing 2 wt % of Al relative to Zn, and ZnSnO layer means a layer containing 50 wt % of Sn relative to Zn. Ti film 4 of the blocker film 4 is described as a layer when the blocker film 4 has been formed, and it is oxidized by forming the dielectric film on the blocker film 4.

Soda-lime glass plate G (thickness: 2 mm)/ZnSnO layer (61.8)/ZnAlO layer (20.1)/Ag film (13.1)/Ti film (0.2)/ZnAlO layer (20.5)/ZnSnO layer (126.6)/ZnAlO layer (20.5)/Ag film (12.6)/Ti film (0.2)/ZnAlO layer (18.6)/

TABLE 6

|  | Visible light transmittance (%) | Visible light reflectance (%) | | Solar radiation transmittance (%) | Solar radiation reflectance (%) | | Transmitted color tone a* | | Film surface reflected color tone a* | | Substrate surface reflected color tone a* | |
|---|---|---|---|---|---|---|---|---|---|---|---|---|
|  |  | Film surface | Substrate surface |  | Film surface | Substrate surface | 10 deg. | 60 deg. | 10 deg. | 60 deg. | 10 deg. | 60 deg. |
| Com. Ex. 1 | 78.9 | 7.0 | 7.9 | 35.1 | 47.1 | 42.4 | −3.8 | −5.4 | 1.9 | 1.6 | −1.2 | 4.0 |
| Com. Ex. 2 | 72.5 | 13.0 | 15.0 | 32.7 | 48.8 | 45.1 | 2.5 | −3.0 | −24.3 | −6.9 | −26.4 | −6.8 |
| Com. Ex. 3 | 82.1 | 4.8 | 6.2 | 36.3 | 43.2 | 42.2 | −7.8 | −7.0 | 24.0 | 6.2 | 21.9 | 8.7 |
| Com. Ex. 4 | 80.2 | 4.8 | 5.9 | 34.0 | 46.4 | 44.7 | −5.5 | −5.2 | 8.2 | −2.9 | 7.5 | 3.3 |
| Com. Ex. 5 | 71.7 | 14.9 | 17.7 | 34.8 | 45.8 | 42.6 | 0.4 | −2.7 | −13.4 | −5.0 | −11.0 | −6.1 |
| Com. Ex. 6 | 73.2 | 12.1 | 15.3 | 33.3 | 46.6 | 45.2 | 2.1 | −4.2 | −24.3 | −2.6 | −21.6 | −1.4 |
| Com. Ex. 7 | 71.3 | 13.6 | 14.7 | 28.9 | 52.4 | 49.2 | −4.9 | −8.4 | −1.0 | 2.8 | −3.0 | 5.7 |
| Com. Ex. 8 | 78.9 | 7.8 | 9.9 | 38.1 | 41.9 | 40.0 | 0.2 | −3.0 | −17.8 | −3.0 | −14.9 | −3.0 |
| Com. Ex. 9 | 77.6 | 9.6 | 11.9 | 40.0 | 39.7 | 38.2 | 0.6 | −2.9 | −14.5 | −0.4 | −12.1 | −1.9 |

As above, in Comparative Mode 1, those less than 74% in visible light transmittance and those exceeding 38% in solar radiation transmittance are found. Furthermore, there are those having reddish colors in the transmitted color tone and the reflected color tone even if the above-mentioned transmittances are sufficient, and they are not suitable for the object of the invention of the present application.

Comparative Mode 2

Comparative Mode 2 is described in the following. The film thicknesses are described in parentheses. Furthermore, ZnSnO layer (114.7)/ZnAlO layer (18.6)/Ag film (11.9)/Ti film (0.2)/ZnAlO layer (20.1)/ZnSnO layer (62)/SiAlO layer (151.7).

In the above Comparative Mode 2, the total film thickness of the metal films is 37.6 nm, the ratio of the second metal film 2 to the first metal film is 0.96, the ratio of the second metal film 2 to the third metal film is 1.07, the average refractive index of the first dielectric film 10 as a whole is 2.03, and the average refractive index of the fourth dielectric film 40 as a whole is 1.67.

Respective optical characteristics of Comparative Mode 2 are shown in Table 7.

TABLE 7

|  | Visible light transmittance (%) | Visible light reflectance (%) | | Solar radiation transmittance (%) | Solar radiation reflectance (%) | | Transmitted color tone a* | | Film surface reflected color tone a* | | Substrate surface reflected color tone a* | |
|---|---|---|---|---|---|---|---|---|---|---|---|---|
|  |  | Film surface | Substrate surface |  | Film surface | Substrate surface | 10 deg. | 60 deg. | 10 deg. | 60 deg. | 10 deg. | 60 deg. |
|  | 66.65 | 19.21 | 17.34 | 26.67 | 70.67 | 49.18 | −2.952 | −6.752 | −3.341 | 2.239 | −9.378 | −2.494 |

Comparative Mode 2 is one that a layer having a refractive index of 2.4 or higher is not contained in the first dielectric film 10, becoming extremely insufficient in visible light transmittance.

Figure 2:
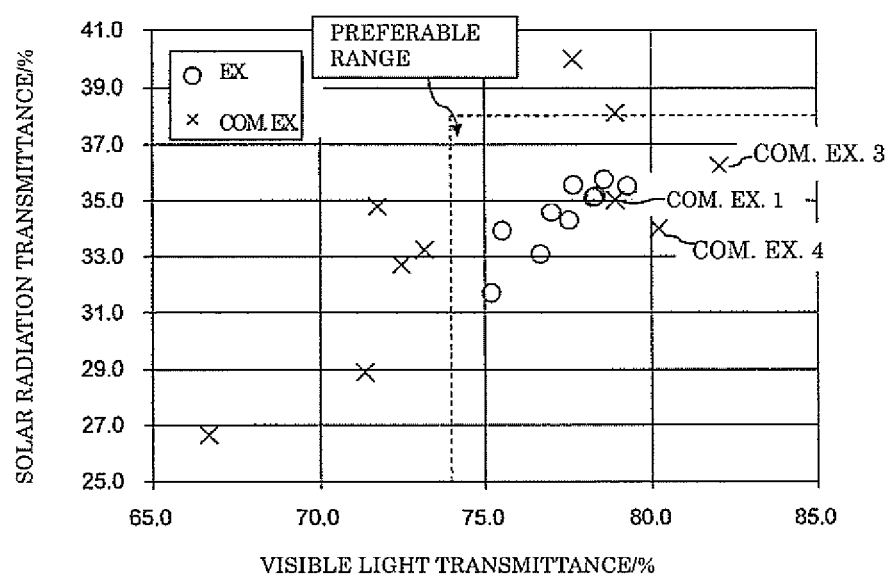
FIG. 2 is a graph prepared by plotting the visible light transmittances and the solar radiation transmittances of exemplary mode of the present invention and comparative modes.
Figure 3:
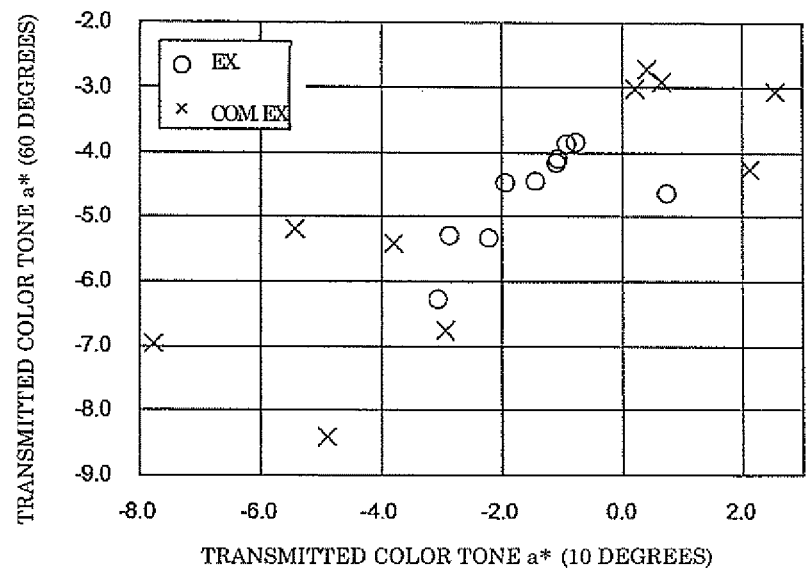
FIG. 3 is a graph prepared by plotting the transmitted color tones a* at 10 degrees and the transmitted color tones a* at 60 degrees of exemplary mode of the present invention and comparative modes.
Figure 4:
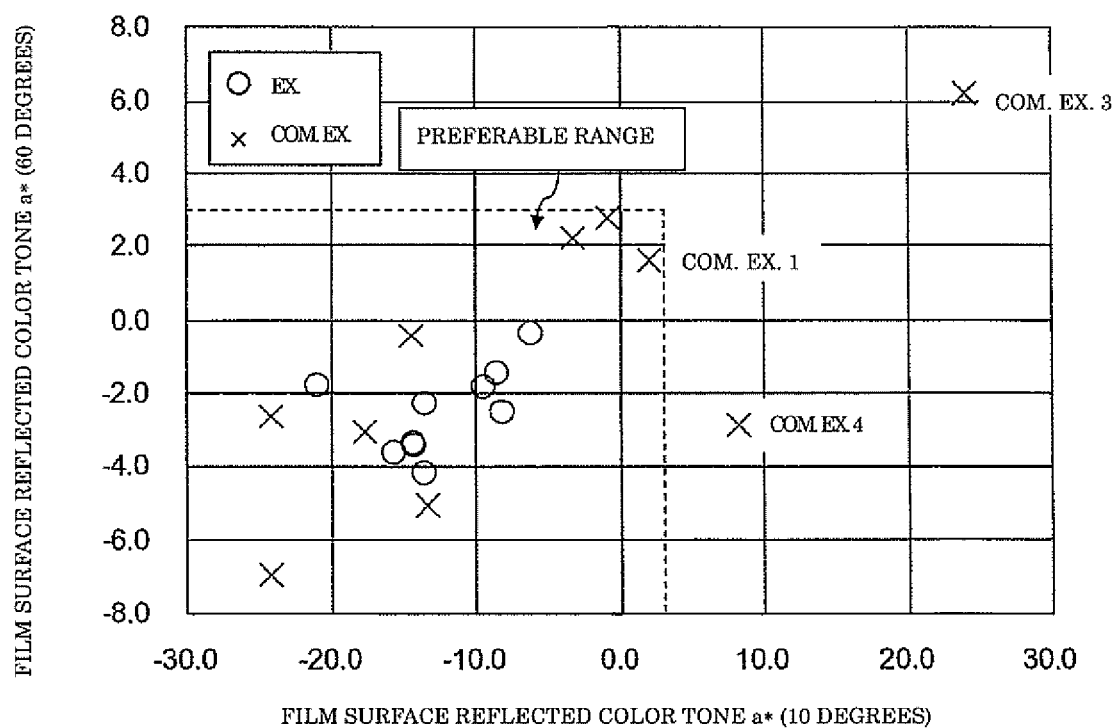
FIG. 4 is a graph prepared by plotting the film surface reflected color tones a* at 10 degrees and the film surface reflected color tones a* at 60 degrees of exemplary mode of the present invention and comparative modes.
Figure 5:
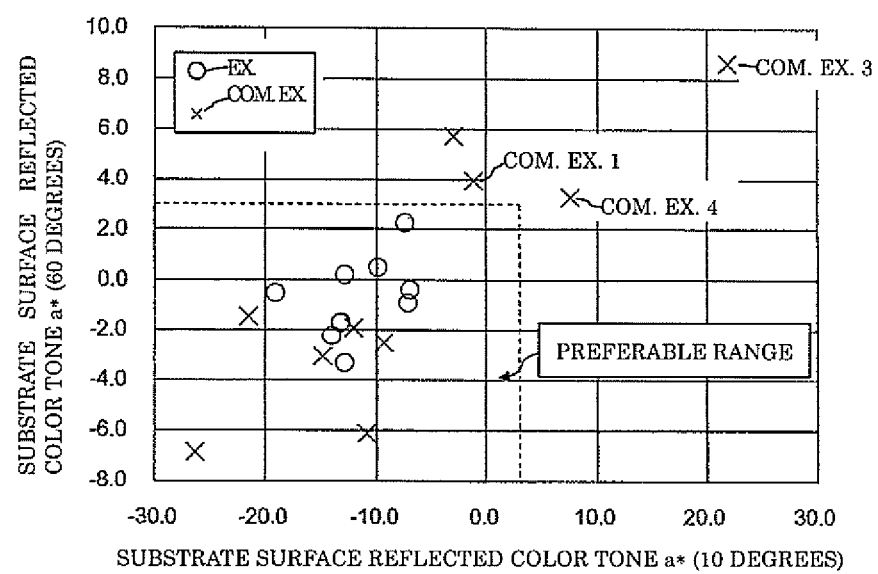
FIG. 5 is a graph prepared by plotting the substrate surface reflected color tones a* at 10 degrees and the substrate surface reflected color tones a* at 60 degrees of exemplary mode of the present invention and comparative modes.

Furthermore, FIG. 2 shows a graph prepared by plotting the visible light transmittances and the solar radiation transmittances of exemplary mode and comparative modes. FIG. 3 shows a graph prepared by plotting the transmitted color tones a* at 10 degrees and the transmitted color tones a* at 60 degrees. FIG. 4 shows a graph prepared by plotting the film surface reflected color tones a* at 10 degrees and the film surface reflected color tones a* at 60 degrees. FIG. 5 shows a graph prepared by plotting the substrate surface reflected color tones a* at 10 degrees and the substrate surface reflected color tones a* at 60 degrees.

It is understood from FIG. 3 that, in each of the exemplary mode and the comparative modes, the redness of the transmitted color tone can be reduced when viewed from the front and when obliquely viewed. Furthermore, it is shown in FIG. 2 that Comparative Examples 1, 3 and 4 are comparable to Examples in visible light transmittance and solar radiation transmittance. It is, however, understood from FIGS. 4 and 5 that the film surface reflected color tone and the substrate reflected color tone have redness in Comparative Examples 1, 3 and 4. Therefore, it is possible to say from FIG. 2 to FIG. 5 that the exemplary mode shows desired values in visible light transmittance and solar radiation transmittance and reduced redness in transmitted color tone and reflected color tone and that the comparative modes do not reach the exemplary mode in optical characteristics and external appearance.

EXPLANATION OF SIGNS

G: glass plate, 1: first metal film, 2: second metal film, 3: third metal film, 4: blocker film, 10: first dielectric film, 11: passivation layer, 12: anti-reflective layer, 13: seed layer, 20: second dielectric film, 22: anti-reflective layer, 23: seed layer, 30: third dielectric film, 32: anti-reflective layer, 33: seed layer, 40: fourth dielectric film, 42: anti-reflective layer, 44: protective layer, 50: multilayered film, and 55: solar radiation shielding member.

The invention claimed is:

1. A solar radiation shielding member, wherein a first dielectric film, a first metal film, a second dielectric film, a second metal film, a third dielectric film, a third metal film, and a fourth dielectric film are stacked in this order on a transparent substrate,
    wherein the first dielectric film comprises at least two dielectric layers containing a layer having a refractive index of 2.4 or greater, and the first dielectric film as a whole has a refractive index in a range of 1.8-2.0,
    wherein the second dielectric film has an optical film thickness of 165-201 nm,
    wherein the third dielectric film has an optical film thickness of 147-182 nm,
    wherein the fourth dielectric film has an optical film thickness of 75-120 nm,
    wherein a geometric film thickness of the first metal film, the second metal film, and the third metal film is 30-40 nm in total,
    wherein a geometric film thickness of the second metal film is in a range of 1.01-1.55 relative to a geometric film thickness of each of the first metal film and the third metal film.

2. The solar radiation shielding member as claimed in claim 1, wherein the first dielectric film has an anti-reflective layer comprising a Ti-containing oxide, and the anti-reflective layer has an optical film thickness of 5-70 nm.

3. The solar radiation shielding member as claimed in claim 1, wherein each of the second dielectric film, the third dielectric film, and the fourth dielectric film has a dielectric comprising an oxide containing Zn and Sn.

4. The solar radiation shielding member as claimed in claim 1, wherein the first dielectric film has an optical film thickness of 105-140 nm.

5. The solar radiation shielding member as claimed in claim 1, wherein the fourth dielectric film has a dielectric layer comprising a Ti-containing oxide, and the fourth dielectric film as a whole has an average refractive index of 1.85-2.05.

6. A solar radiation shielding member,
    wherein a first dielectric film, a first metal film, a second dielectric film, a second metal film, a third dielectric film, a third metal film, and a fourth dielectric film are stacked in this order on a transparent substrate,
    wherein the first dielectric film comprises at least two dielectric layers containing a layer having a refractive index of 2.4 or greater, and the first dielectric film as a whole has a refractive index in a range of 1.8-2.0,
    wherein the second dielectric film has an optical film thickness of 165-201 nm,
    wherein the third dielectric film has an optical film thickness of 147-182 nm,
    wherein the fourth dielectric film has an optical film thickness of 75-120 nm,
    wherein a geometric film thickness of the first metal film, the second metal film, and the third metal film is 30-40 nm in total,
    wherein a geometric film thickness of the second metal film is in a range of 1.01-1.55 relative to a geometric film thickness of each of the first metal film and the third metal film,
    wherein the first dielectric film has an anti-reflective layer comprising a Ti-containing oxide, and the anti-reflective layer has an optical film thickness of 5-70 nm, and
    wherein the first dielectric film has a passivation layer comprising a Si-containing oxide, the anti-reflective layer comprising a Ti-containing oxide, and a seed layer comprising a Zn-containing oxide in this order on the transparent substrate.

7. A solar radiation shielding member,
    wherein a first dielectric film, a first metal film, a second dielectric film, a second metal film, a third dielectric film, a third metal film, and a fourth dielectric film are stacked in this order on a transparent substrate,
    wherein the first dielectric film comprises at least two dielectric layers containing a layer having a refractive index of 2.4 or greater, and the first dielectric film as a whole has a refractive index in a range of 1.8-2.0,
    wherein the second dielectric film has an optical film thickness of 165-201 nm,
    wherein the third dielectric film has an optical film thickness of 147-182 nm,
    wherein the fourth dielectric film has an optical film thickness of 75-120 nm,
    wherein a geometric film thickness of the first metal film, the second metal film, and the third metal film is 30-40 nm in total,
    wherein a geometric film thickness of the second metal film is in a range of 1.01-1.55 relative to a geometric film thickness of each of the first metal film and the third metal film, and wherein, when the transparent substrate of the solar radiation shielding member is a glass plate having a thickness of 2 mm, at positions inclined by 10 degrees and 60 degrees from a direction perpendicular to a glass surface of the glass plate, each a* of a transmitted light and a reflected light, which is obtained in accordance with CIE L*a*b* color space, is less than +3.

* * * * *